United States Patent

[11] 3,580,013

| | | |
|---|---|---|
| [72] | Inventor | Gary W. Ballard<br>Liverpool, N.Y. |
| [21] | Appl. No. | 829,622 |
| [22] | Filed | June 2, 1969 |
| [45] | Patented | May 25, 1971 |
| [73] | Assignee | Carrier Corporation<br>Syracuse, N.Y. |

[54] ABSORPTION REFRIGERATION MACHINE WITH GENERATOR LEVEL CONTROL
5 Claims, 2 Drawing Figs.

[52] U.S. Cl. .................................................. 62/148,
62/476, 137/392, 307/231, 307/308
[51] Int. Cl. ...................................................... F25b 15/04
[50] Field of Search .......................................... 62/148;
137/392

[56] References Cited
UNITED STATES PATENTS
| | | | |
|---|---|---|---|
| 2,298,924 | 10/1942 | Bichowsky .................. | 62/148 |
| 3,367,137 | 2/1968 | Whitlow ...................... | 62/148X |

*Primary Examiner*—Martin P. Schwardron
*Assistant Examiner*—P. D. Ferguson
*Attorneys*—Harry G. Martin, Jr. and J. Raymond Curtin

ABSTRACT: An absorption refrigeration system including an electronic control circuit employing a level sensing probe to prevent operation of the absorption refrigeration system heating means when the probe is not submerged in absorbent solution.

Patented May 25, 1971
3,580,013
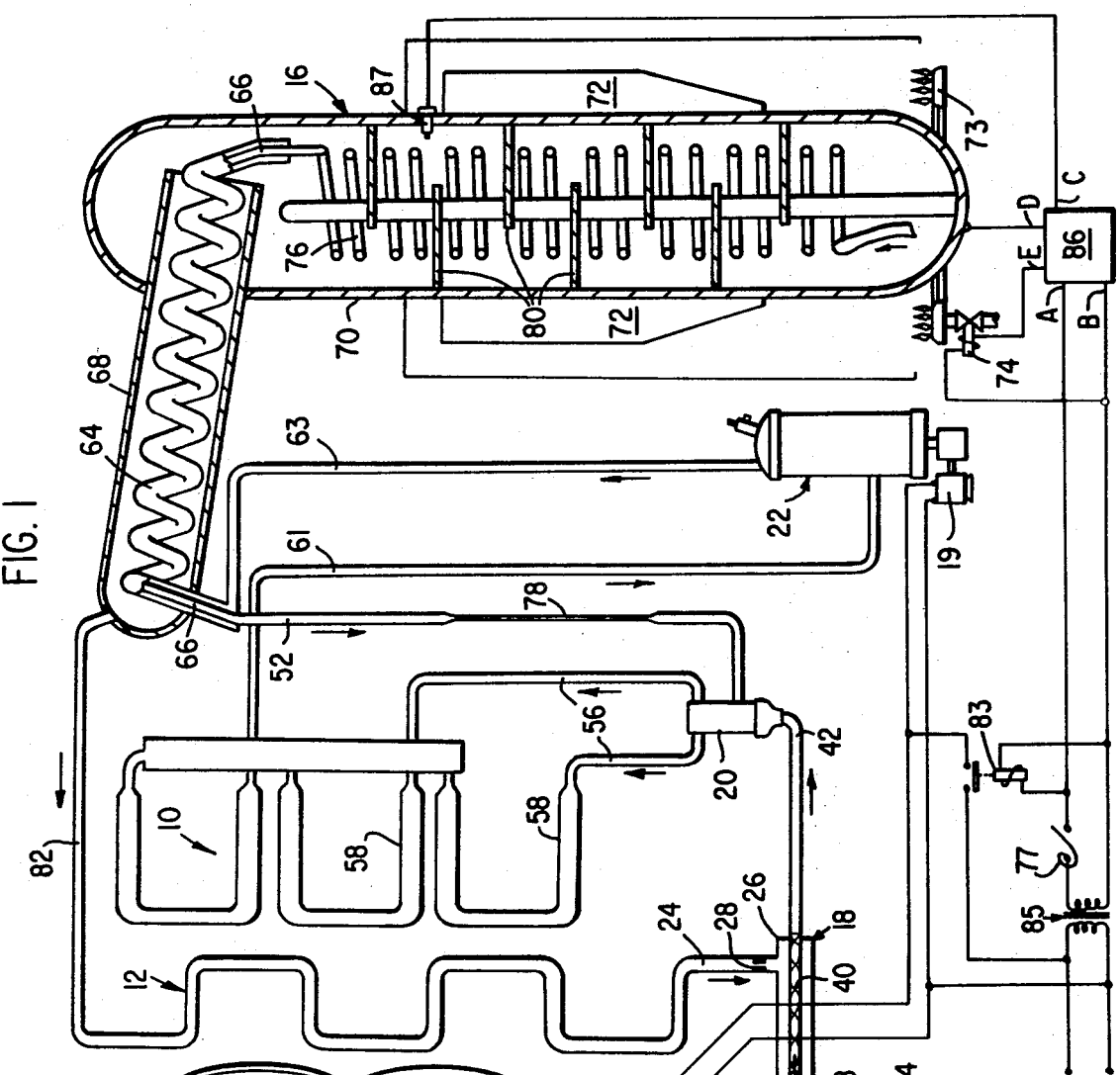
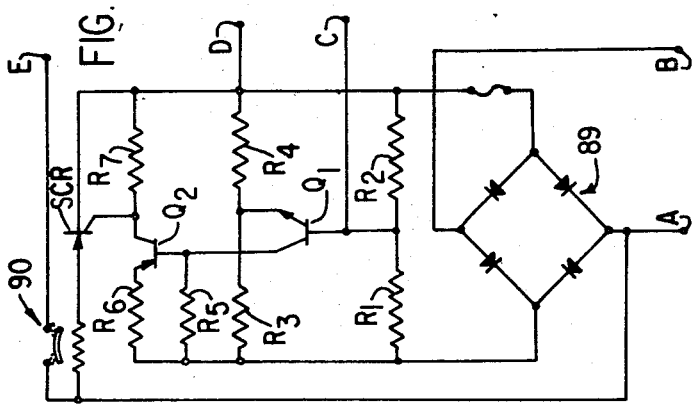
INVENTOR.
GARY W. BALLARD.
BY James E. Echardt
ATTORNEY.

ABSORPTION REFRIGERATION MACHINE WITH GENERATOR LEVEL CONTROL

BACKGROUND OF THE INVENTION

In absorption refrigeration systems, a number of conditions may be encountered which result in a low solution level in the generator. This condition is especially prevalent at startup or if the pump or solution transfer device malfunctions. Under these conditions, the generator is quickly overheated. Temperature sensing devices are therefore commonly employed to shut the machine down when the generator overheats. However, if there is a malfunction, the generator must overheat before the machine shuts down which is detrimental to the generator. Further, an operating condition could be encountered which would cause a fairly long delay in providing solution to the generator, causing the generator to overheat and the machine to shut down even though there is no malfunction. The machine would ordinarily then have to be restarted by a serviceman.

SUMMARY OF THE INVENTION

This invention relates to an absorption refrigeration machine having a generator and condenser on the high pressure side and an absorber and evaporator on the low pressure side thereof connected to provide refrigeration. An electronic control circuit in conjunction with a level sensing probe in the generator is utilized to activate the generator heating means when the probe is submerged in solution by utilizing the solution to provide a capacitance effect in the electronic circuit.

BRIEF DESCRIPTION OF THE DRAWINGS

FIG. 1 is a schematic diagram of an absorption refrigeration machine; and

FIG. 2 is a schematic diagram of the electronic control employed in the electrical circuit of the absorption refrigeration machine to sense the level of refrigerant in the generator.

DESCRIPTION OF THE PREFERRED EMBODIMENT

Referring to FIG. 1 of the drawing, there is shown a refrigeration system comprising an absorber 10, a condenser 12, an evaporator or chiller 14, a generator 16, a liquid-suction heat exchanger 18, and a vapor distributor 20, connected to provide refrigeration. A pump 22 actuated by a pump motor 19 is employed to circulate weak absorbent solution from absorber 10 to generator 16.

As used herein, the term "weak absorbent solution" refers to solution which is weak in absorbent power, and the term "strong absorbent solution" refers to a solution which is strong in absorbent power. A suitable absorbent for use in the system described is water; a suitable refrigerant is ammonia.

Liquid refrigerant condensed in condenser 12 passes through refrigerant liquid passage 24 to the liquid-suction heat exchanger. The liquid-suction heat exchanger 18 includes a housing 26 having a refrigerant restrictor 28 at the upstream end thereof and a refrigerant restrictor 30 at the downstream end thereof. A portion of the liquid refrigerant supplied to the liquid-suction heat exchanger 18 flashes upon passing through restrictor 28 due to the low pressure existing downstream of the restrictor, thereby cooling the remainder of the refrigerant in the housing 26. The cooled refrigerant liquid and flashed refrigerant vapor then pass through restrictor 30 into heat exchanger 32 of chiller 14.

A heat exchange medium such as water is passed over the exterior of heat exchanger 32 where it is chilled by giving up heat to evaporate the refrigerant within the heat exchanger. The chilled heat exchange medium passes out of chiller 14 through line 34 to suitable remote heat exchangers (not shown) after which it is returned to the chiller through inlet 36 for rechilling.

The cold refrigerant evaporated in heat exchanger 32, along with a small quantity of absorbent which is carried over to the chiller with the refrigerant from the generator, passes into refrigerant vapor passage 38 of liquid-suction heat exchanger 18. The refrigerant vapor and absorbent liquid, which has a large quantity of refrigerant absorbed therein, passes through refrigerant vapor passage 38 in heat exchange relation with the refrigerant passing through housing 26. Refrigerant vapor passage 38 is provided with a turbulator 40 which consists of a twisted metal strip to provide a tortuous flow path for the vapor to provide optimum heat transfer between the vapor and liquid in passage 38 and the liquid refrigerant in housing 26. By passing the vapor and liquid in passage 38 in heat transfer with the liquid refrigerant in housing 26, a large quantity of refrigerant in the absorbent liquid in passage 38 is vaporized. The heat of vaporization is therefore removed from the liquid in housing 26, thereby reducing the temperature of the liquid refrigerant supplied to heat exchanger 32. This heat transfer within the liquid-suction heat exchanger 18 provides an increase in the absorption machine efficiency by transferring heat from the liquid supplied thereto from the condenser to the refrigerant vapor and absorbent liquid discharged from the chiller.

Refrigerant vapor and absorbent solution from passage 38 is supplied to refrigerant distributor 20 through line 42. Strong solution, which is supplied from the generator to distributor 20 through line 52, mixes with the vapor and solution supplied to the distributor through line 42. The refrigerant vapor-absorbent solution mixture from distributor 20 is supplied to individual circuits 58 of the absorber 10 through absorber supply tubes 56. A cooling medium, preferably ambient air, is passed over the surface of the absorber by fan means including motor 59 in heat exchange relation with the solution therein for cooling the absorbent solution to promote the absorption of the refrigerant vapor by the solution. The same cooling medium may be supplied to condenser 12 in heat exchange relation with refrigerant vapor therein to condense the refrigerant.

Cold weak absorbent solution passes from absorber 10 through line 61 into pump 22. Liquid from pump 22 is passed through line 63 to rectifier heat exchange coil 64. The weak solution passes through coil 64 in heat exchange relation with hot strong solution passing through heat exchange coil 66 disposed within coil 64 and with the hot refrigerant vapor flowing through rectifier shell 68 in contact with the outer surface of coil 64. The weak solution from coil 64 is discharged into the upper portion of generator 16 along with any vapor which is formed in coil 64 due to heat exchange with the hot vapor passing thereover and the hot solution flowing therethrough.

Generator 16 comprises a shell 70 having tapered fins 72 suitably affixed thereto as by welding. The generator is heated by suitable means such as gas burner 73 having a gas valve 74 associated therewith to control the flow of gas to the burner. An electrical circuit including a room thermostat 77, a relay 83, transformer 85, gas valve 74, electronic control 86, liquid probe 87, pump motor 19, and fan motor 59 is provided to control the machine. When the thermostat 77 closes in response to room temperature, the circuit including relay 83, valve 74, and electronic control 86 is completed. The relay 83 in turn completes the circuit including fan motor 59 and pump motor 19. It can be seen by reference to FIG. 1 that the relay 83 is connected in parallel with gas valve 74 and electronic control 86. In the event there is an insufficient quantity of solution in the generator, electronic control 86 will prevent flow of current to the gas valve. However, relay 83 will be held closed irrespective of the position of gas valve 74. The pump 19 will therefore remain in operation for forwarding solution to the generator. When a sufficient quantity of solution has been provided to the generator, the electronic control 86, in a manner to be hereinafter explained, will complete the circuit through the gas valve. The gas valve 74 will open, and heat will be supplied to the generator. Should the solution level in the generator drop during any time or during any period of machine operation, the electronic control 86 will temporarily close the gas valve to prevent operation of the generator burner until the solution level in the generator reaches the proper level.

Referring more particularly to FIG. 2, the electronic control 86 comprises a diode bridge 89; resistors $R_1$, $R_2$, $R_3$, $R_4$, $R_5$, $R_6$, and $R_7$; transistors $Q_1$ and $Q_2$; silicon controlled rectifier SCR; and a time delay relay 90 comprising a heater and a heat actuated normally opened switch.

By reference to FIG. 1, it can be seen that the line D is connected to the generator shell 70 while the line C is connected to the probe 87. When there is sufficient aqua-ammonia solution in the generator to submerge probe 87, the solution functions as a capacitor connected between lines C and D. The electronic control 86 utilizes this capacitance effect of the solution to control gas valve 74.

The control circuit of FIG. 2 operates as follows. Diode bridge 89 provides a full wave rectified supply voltage to the control. Resistors $R_1$, $R_2$, $R_3$, and $R_4$ form a resistance bridge with transistor $Q_1$ as the error voltage detector. When solution comes in contact with probe 87, a positive DC voltage is developed at the base of transistor $Q_1$ due to the capacitive effect of the solution. This is sufficient to forward bias transistor $Q_1$ and turn it on for approximately the first 10° of each half cycle of controlled voltage. For a period corresponding to approximately 10° through 170° of the cycle, the voltage difference between the base and emitter of transistor $Q_1$ is not sufficient to forward bias $Q_1$. Thus, $Q_1$ is off during this time. From 170° of the half cycle to approximately 10° of the following cycle, $Q_1$ is again forward biased and turns on.

When $Q_1$ turns on, the resulting voltage drop across resistor $R_5$ forward biases transistor $Q_2$ causing it to conduct current through resistors $R_6$ and $R_7$ which in turn causes SCR to turn on. The SCR will remain "latched on" until the end of the half cycle. Thus, the SCR will turn on for each positive portion of the controlled voltage cycle and conduct current through time delay relay 90 as long as solution is in contact with the probe.

If solution is in contact with the probe for several seconds, the time delay relay will heat up sufficiently so that the switch therein will close and conduct current to energize the gas valve. After the relay has been energized for a short time, it will require several seconds for the relay to cool down and the relay contacts to open when solution is no longer in contact with the probe. This time delay is provided to prevent intermittent operation of the gas valve due to vapor bubbles passing the probe 87 or due to surges of solution in the generator.

Stated another way, when there is no solution at the probe or the probe has an open circuit or a disconnected line, the voltages at the base and emitter of transistor $Q_1$ are essentially equal. Thus, $Q_1$ is off and the relay will not energize. When solution is present at the probe, and assuming there is no short in the system, a DC voltage is created at the base of $Q_1$ due to the capacitance effect of the solution. This DC voltage is sufficient to turn on $Q_1$ which in turn causes $Q_2$ and SCR to turn on and energize relay 90. If the probe should develop a short or low impedance path to ground, the voltage at the base of $Q_1$ will be less than emitter voltage, and $Q_1$ will be off.

It can be seen from the foregoing that electronic control 86 is "fail-safe" in that the gas valve will not be energized unless there is solution in the generator. A short to ground will not cause the control to energize gas valve 74.

Since the generator will remain within safe operating temperature limitations as long as there is sufficient solution to cover probe 87, the danger of overheating the generator is remote. Should another portion of the system such as the solution pump fail, the machine will shut down almost immediately due to the rapid drop of solution in the generator below the level of probe 87.

The above described control system is far superior to a control system employing high temperature limit switches to shut off the machine when the generator overheats. These switches actually require the generator to be overheated before the machine will shut down. By utilizing a level sensor in the generator to control heat input thereto, a problem is sensed before generator temperatures can rise, and detrimental overheating of the generator is avoided.

A second, seemingly unrelated advantage in machine operation is obtained by utilizing the solution level sensor to control the heat input to the generator. As ambient temperature drops, it is sometimes difficult to start aqua-ammonia absorption refrigeration machines as the solution level in the generator initially rises, causing solution to pass into the condenser. This reduces the already low, high side pressure and causes violent boiling in the generator. The solution level in the generator will then drop to a point where the generator overheats and the machine shuts off in response to the thermal sensor normally employed in an absorption refrigeration machine. Once the machine is shut off by the thermal sensor, it may be necessary to manually reset the controls to place the machine back in operation.

With the level sensor, if the level in the generator drops shortly after startup, the burner would shut off, the level in the generator would again rise, and the burner would turn on again. The machine can cycle ON and OFF under these conditions until the temperature of the machine reaches a high enough level to allow proper operation of the machine.

The weak solution in generator 16 is boiled to form a strong solution and refrigerant vapor. The hot strong absorbent solution passes upwardly through the analyzer section of generator 16 through analyzer coil 76 in heat exchange with the weak solution passing downwardly over the coil. The warm strong solution then passes through heat exchange coil 66 within coil 64 and line 52 into the distributor 20. A restrictor 78 is provided in line 52 so that the solution supplied to the vapor distributor 20 is at the same pressure as the vapor in line 42.

Refrigerant vapor formed in generator 16 passes upwardly through the analyzer section thereof where it is concentrated by mass heat transfer with weak solution passing downwardly over analyzer coil 76. Analyzer plates 80 in generator 16 provide a tortuous path for flow of solution and vapor to assure intimate contact therebetween to improve the mass heat transfer. The vapor then passes through rectifier 68 in heat exchange relation with the weak solution passing through coil 64. Absorbent condensed in rectifier 68 flows downwardly into the generator along with the weak solution discharged from coil 64. Refrigerant vapor passes from rectifier 68 through line 82 to condenser 12 to complete the refrigeration cycle.

I claim:

1. An absorption refrigeration machine having a generator, condenser, evaporator, and absorber connected to provide refrigeration, heating means adapted to heat the solution in the generator, a control circuit for preventing operation of the generator heating means when the quantity of solution in the generator is below a preselected minimum level, said control circuit having one side thereof connected to the machine, a probe associated with said generator adapted for contact by absorbent solution when the solution level in the generator is above the preselected minimal level, said probe being electrically connected to the other side of said control circuit, solution at said probe providing a capacitance effect in said control circuit, and switch means actuated in response to the capacitance effect between said probe and ground adapted to activate the generator-heating means.

2. An absorption refrigeration machine according to claim 1 wherein said control circuit includes:

a diode bridge to provide DC current, and a resistance bridge associated with said diode bridge, the negative side of said resistance bridge being connected to the machine, said probe being electrically connected between two of the resistors of said resistance bridge, said switch means being actuated when the capacitance effect of the absorbent solution provides a positive voltage between said two resistors in relation to the voltage across the resistance bridge.

3. An absorption refrigeration machine according to claim 2 wherein said control circuit includes a transistor, one side of said transistor being connected to the positive side of said circuit through a resistor, the other side of said transistor being connected between the second two resistors in the resistance bridge, the base of said transistor being connected between said first two resistors of said resistance bridge, the capacitance effect of the absorbent solution in the generator causing said transistor to be forward biased for a portion of each cycle produced by the diode bridge, thereby causing the transistor to conduct current therethrough to actuate said switch means.

4. An absorption refrigeration machine according to claim 3 wherein said control circuit further includes:
   a second transistor,
   a second resistor connected between the positive side of said circuit and said second transistor,
   a third resistor connected between said second transistor and the negative side of said circuit, the base of said second transistor being connected to the positive side of said first transistor, and
   a silicon-controlled rectifier connected in series with said switch means, the gate of said silicon-controlled rectifier being connected to the positive side of said third resistor, the forward biasing of said first transistor causing said second transistor to be forward biased which in turn causes said SCR to turn on to conduct current through said switch means for actuating said switch.

5. An absorption refrigeration machine according to claim 4 wherein said switch means is a time delay relay.